United States Patent [19]
Crane

[11] 3,907,223
[45] Sept. 23, 1975

[54] VOICE-DIRECTED AIRCRAFT NAVIGATION SYSTEM AND DIRECTION FINDER

[76] Inventor: Carl J. Crane, P.O. Box 316, Helotes, Tex. 78023

[22] Filed: Apr. 25, 1974

[21] Appl. No.: 463,957

Related U.S. Application Data
[63] Continuation-in-part of Ser. No. 262,528, June 14, 1972, Pat. No. 3,840,877.

[52] U.S. Cl. .......... 244/77 A; 343/5 GC; 343/108 R
[51] Int. Cl.² ..................... B64C 13/20; G01S 9/22
[58] Field of Search ............ 179/1 VC, 1 VE, 100.2; 235/150.22; 244/77 A, 77 B, 77 C; 340/26; 343/5 LS, 5 GC, 102, 108 R, 112 D, 113 R

[56] References Cited
UNITED STATES PATENTS
| | | | |
|---|---|---|---|
| 2,322,225 | 6/1943 | Crane et al. | 244/77 A |
| 3,051,950 | 8/1962 | Granqvist | 343/102 X |
| 3,096,513 | 7/1963 | Cutler | 343/5 GC X |
| 3,146,448 | 8/1964 | Shelley | 343/113 R X |
| 3,307,191 | 2/1967 | Crane | 343/108 R |

*Primary Examiner*—Trygve M. Blix
*Assistant Examiner*—Stephen G. Kunin
*Attorney, Agent, or Firm*—Abraham A. Saffitz

[57] ABSTRACT

A navigation-by-communication system for informing the pilot of an aircraft as to the location of the aircraft along the approach-landing path, and along the runway during the critical period of landing and during take-off, especially during conditions of light and/or weather which prevent outside visual reference to terrestrial or celestial fixes and in which an automatic tracking direction finder is connected through switching means to multiple endless magnetic tape reproducers with selected voice recordings.

1 Claim, 13 Drawing Figures

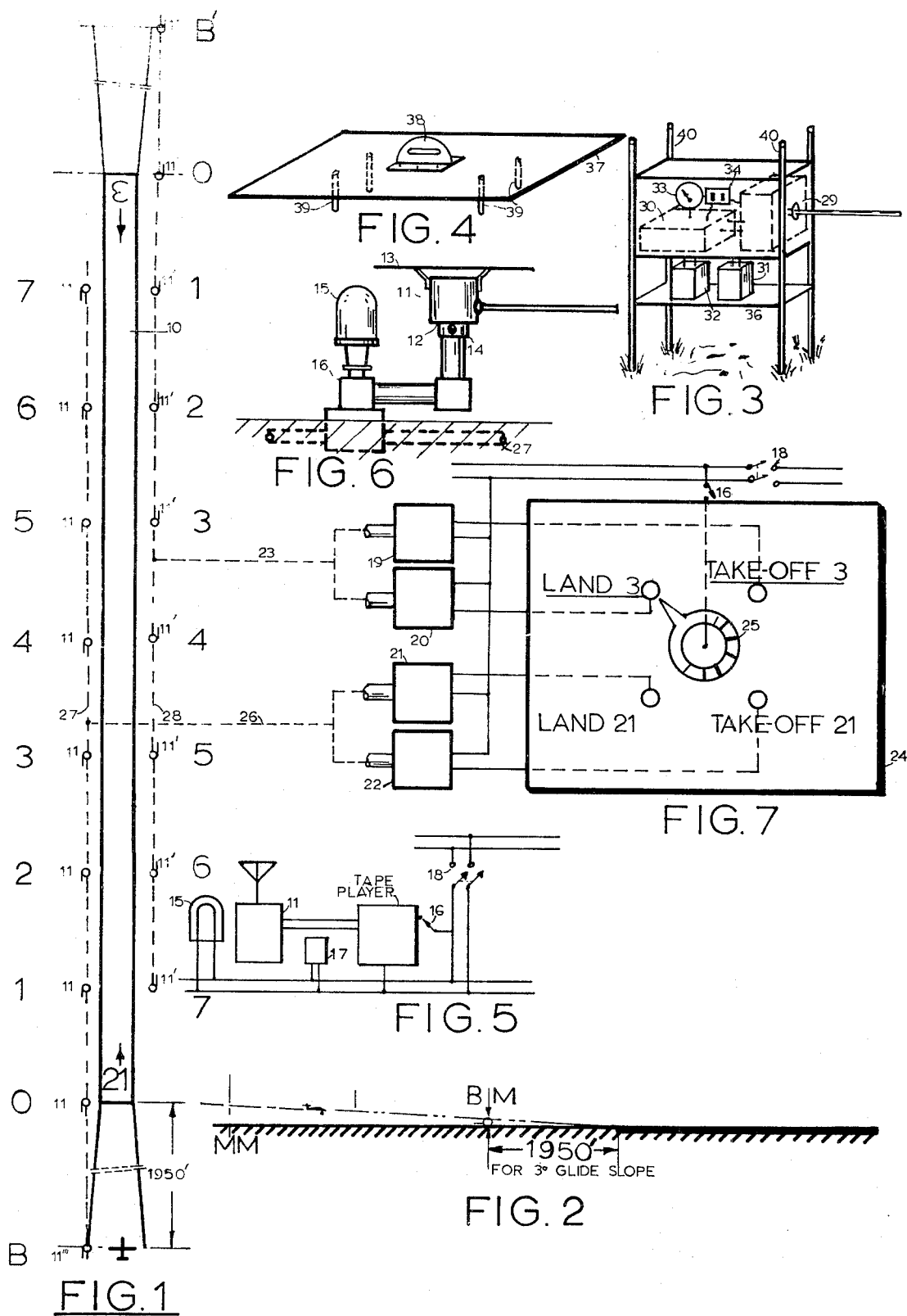

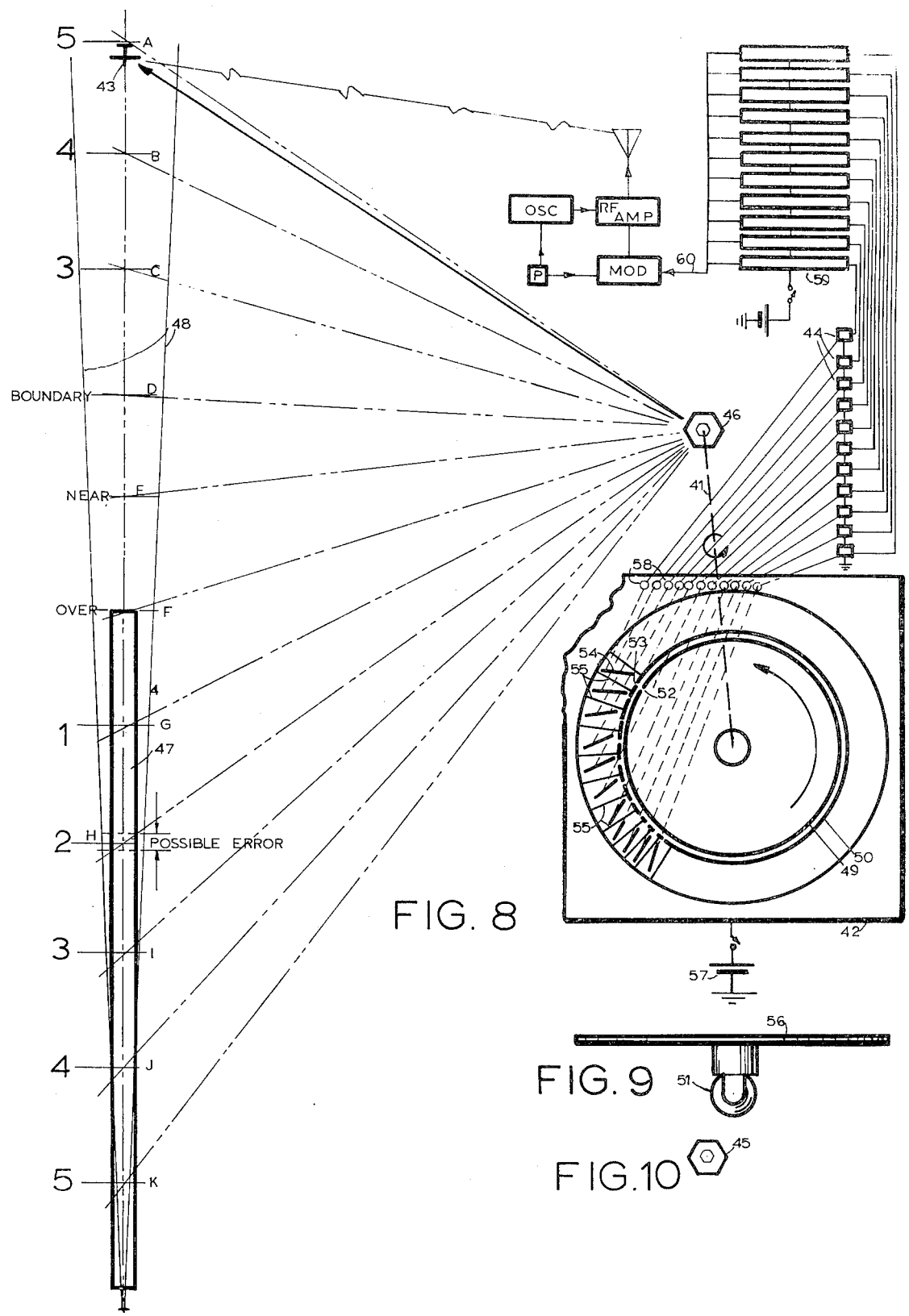

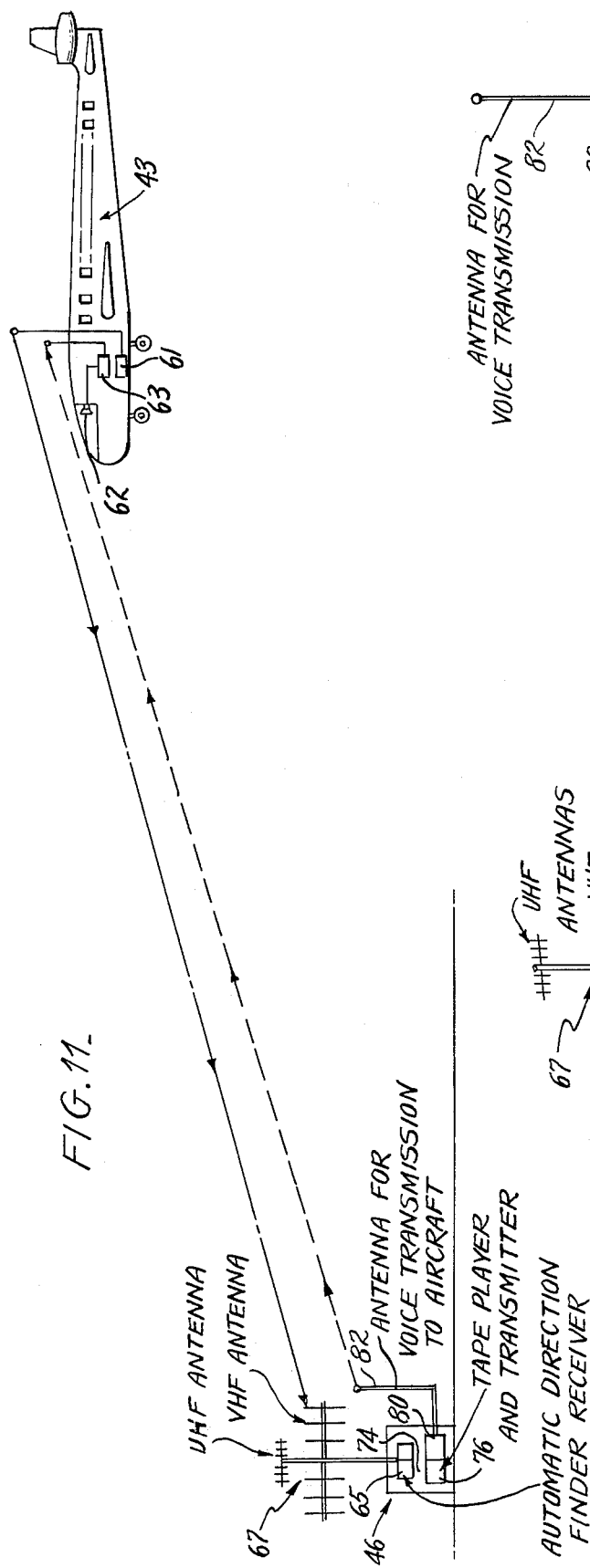
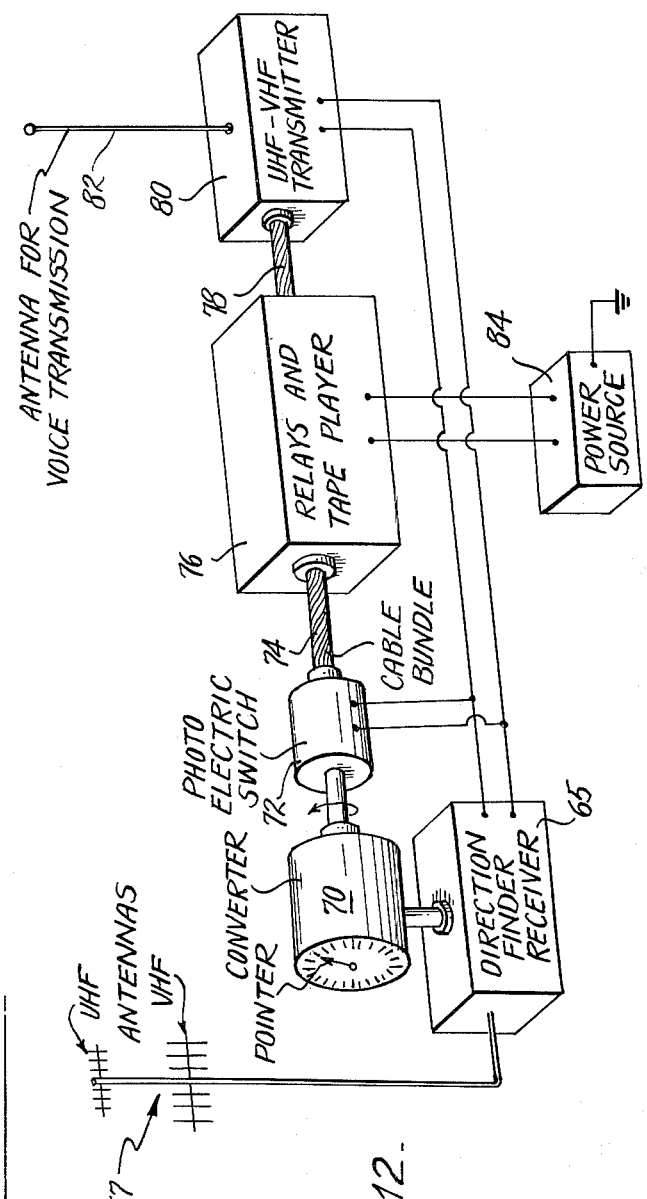
FIG.11.
FIG.12.

3,907,223

VOICE-DIRECTED AIRCRAFT NAVIGATION SYSTEM AND DIRECTION FINDER

CROSS-REFERENCES TO RELATED APPLICATIONS

This application is a Continuation-in-Part of my parent application Ser. No. 262,528, entitled Voice-Directed Aircraft Navigation System, filed June 14, 1972, now U.S. Pat. No. 3,840,877, in which there was claimed the combination of an instrument landing system and an aircraft runway distance monitor system for providing an audible and vocal indication of the longitudinal position of the aircraft along the runway. The present application claims the combination of the audible and vocal indication system with an automatic tracking direction finder for the purpose of identifying the location of the aircraft.

BACKGROUND OF THE INVENTION

1. Field of the Invention

The present invention relates to ground and airborne electronic devices which combine, through systematic cooperative arrangement of the elements, to properly inform the pilot of his location along the flight path during approach, landing, roll-out and/or take-off to or from a landing area respectively. Normally the landing area is a runway. During clear weather and good light conditions, the pilot may see the runway as it is approached in flight. At night he sees the runway as outlined by lights, which are placed in various arrangements to assist in guiding him to the runway threshold and then along the runway. High performance aircraft which land at high speed require a long runway, and even in clear weather and good light the pilot depends on signs placed along the runway which indicate his distance already run, and left to run, along the runway. At night light patterns and colors serve a like nature. When fog or other weather condition obscures the runway the pilot at present has no measure of his location along the runway, and very little aid during the final phase of an instrument approach to the runway.

2. Description of the Prior Art

The contemporary employment of aircraft in day to day operation makes no use of electronic aids in the immediate vicinity of the runway to give the pilot position/distance information during the landing/take-off procedure.

In my U.S. Pat. No. 3,307,191, entitled Aircraft Blind Landing Device and Flight Director System, there is disclosed the positioning of low power radio transmitters along the runway. As the landing aircraft passes within a few feet of each transmitter its transmitted signal is received by the airborne receiver in such a manner as to cause an appropriate lamp to be lighted. The positions of the lamps are such as to indicate the successive positions of the aircraft along the runway. This array of lamps is positioned for ease of viewing within the presentation of the flight instrument.

Another U.S. Pat. No. 2,143,137 issued to D. S. Basim et al, disclosed the use of a boundary marker and only one other marker beacon placed within the runway linear pathway, the purpose of which is as noted in this patent on page 5, column 2, lines 23 to 33 inclusive. This does not anticipate the utilization of electronic transmitters placed and grouped as disclosed herein.

Furthermore in the Basim U.S. Pat. No. 2,143,137 reference is made to the marker beacon 48 of FIG. 10 of the drawing which shows its location at a position that would be disastrous for a landing aircraft. The position of the marker beacon as shown would insure complete overshoot of the runway at least, or impossible take-off performance. The system therefore is inoperable as described in the patent.

Another U.S. Pat. No. 2,784,307 issued to W. D. Burton, describes in great detail the inner design of an improved marker beacon receiver. One drawing in this patent shows a positioning of three marker beacon transmitters external to the landing area. The purpose of this drawing is to portray the manner in which the improved receiver is energized, in order to limit interference from transients, and for other improvements, but the purpose of this invention is best indicated in column 2 of the patent in the sentence beginning on line 28 which states in part, "This invention relates particularly to a radio receiver . . . ."

Another U.S. Pat. No. 2,322,225 issued to Carl J. Crane, George V. Holloman, Raymond K. Stout and Constantin D. Barbulesco, shows the liberal use of marker beacons positioned in the line of approach to the runway and at the far end of the runway; however the use defined a purpose other than informing the pilot visually or by voice of his location.

Accordingly, none of the prior art noted herein which exemplifies the use of marker beacons employs them to continuously advise the pilot by voice means of his position adjacent to and along the runway landing area during the landing or take-off procedure.

Obviously with the exception of U.S. Pat. No. 3,307,191 to Crane the prior art does not exemplify an understanding of the problem facing the aircraft pilot in the touch-down/roll-out phase of the blind landing nor does it propose a solution based on the real need to know constantly the aircraft location in its rapidly changing critical positions along the landing area axis. Nothing in the prior art shows means for take-off guidance as the aircraft begins its roll, gains speed and reaches critical positions at which a take-off must be aborted.

SUMMARY OF THE INVENTION

Thus, with the deficiencies of some of the prior art defined, the instant invention proposes alternate means for continuously advising the pilot by voice from ground-based electronic transmitters, the locus of his aircraft with respect to the runway in the direction of flight during approach/landing or take-off procedure, this means for advising the pilot being useful in combination with the known instrument landing systems and also in combination with an automatic tracking direction finder.

The alternate means in accordance with the invention are:

1. The use of fixed or portable very low power transmitters placed along and adjacent to the aircraft runway throughout its entire length at selected intervals so arranged that selected voice messages will be transmitted continuously, to be heard by the pilot of an aircraft by means of suitable radio receiver as the aircraft passes in the immediate vicinity of the ground-based transmitter.

2. The use of one or more ground-based automatic direction finders which will track an approach-landing aircraft, or one taking off, in such manner that switching means connected to the tracking mechanism of the automatic direction finder will operate to select appropriate stored voice position information that is continuously transmitted from a ground-based electronic transmitter to the communication receiver of the aircraft being tracked so that it may be heard by the pilot as he passes selected surface loci.

It is well known that effort is being made to supply precision DME (distance measuring equipment) with which to equip an aircraft to be used in making blind landings. This costly equipment employs, among other items, complex airborne transponder devices to measure slant range to a ground-based device which itself is costly and which will be required at both ends of a given runway if bi-directional use of the runway is required. This equipment provides a visual (counter type) readout device similar to an automotive odometer. The visual senses of a pilot of an instrument landing aircraft are so heavily taxed that he has neither the time nor concentration ability to read a fast-moving distance counter, plus a fast-moving altimeter (of the digital or tape type) and at the same time respond to the flight director indications and those of other instruments of the contemporary flight control panel.

By eliminating the digital counter of distance and substituting voice conveyed position information the pilot is placed at greater ease, and hence is safer and more capable of responding to the visual indicators displayed on the instrument panel.

Accordingly it is the purpose of this invention to provide electromechanical and electronic devices in combination, many of well known and proven reliability to insure voice-conveyed position information to the pilot of an aircraft in the approach-landing and/or take-off situation, and to accomplish this without adding any additional electronic device or equipment to the airplane equipped with conventional communication radio receivers and marker beacon receiver.

By use of the alternative structure, almost any locale can be served, such as overwater approaches where it may be impractical to locate surface based transmitters.

DESCRIPTION OF THE DRAWINGS

FIG. 1 is a plan view of a landing runway, 8000 feet in length and 200 feet in width, drawn substantially to scale, showing radio transmitter locations to portray the importance of position information and the relationship of the transmitters' locations to a fast-landing aircraft.

FIG. 2 is a vertical view of the approach end of a runway which is assumed to be equipped with the conventional ILS (Instrument Landing System), the guide slope angle of which, for example, is 3°. This portrays a location substantially 1950 feet from the threshold at which is located one of the transmitter sites called the boundary marker.

FIG. 3 depicts a schematic arrangement of the elements of the portable voice-modulated transmitter assembly.

FIG. 4 shows the heat and rain shield that serves to protect the portable unit.

FIG. 5 shows the diagrammatic external circuitry of one of the several permanently installed voice-modulated transmitters.

FIG. 6 shows the general external appearance of the transmitter site adjacent to and supplied with power from the circuitry serving one of the runway lights.

FIG. 7 shows the tape players and related switch which selects the runway transmitter to be activated for take-off or landing.

FIG. 8 shows a complete schematic array for the combined aircraft, runway, tracking direction finder and related switching device, tape players and simple transmitter needed to transmit position information to the pilot of the aircraft, by means of repeated selected wording to define the locus of the aircraft.

FIG. 9 is an edge view of the photoelectric switch box cover with associated lamp.

FIG. 10 is a second location for another automatic tracking direction finder to be located in the event both landings and take-offs would be made from the opposite direction on the runway from that shown.

FIG. 11 illustrates diagrammatically the combination of an automatic direction finder and the voice directed aircraft navigation system in accordance with the invention and illustrates automatic tracking features specifically useful for the embodiments for FIGS. 8–10.

FIG. 12 is a pictorial representation utilizing a VHF/UHF direction finder.

DESCRIPTION OF THE PREFERRED EMBODIMENTS

Figure 13:
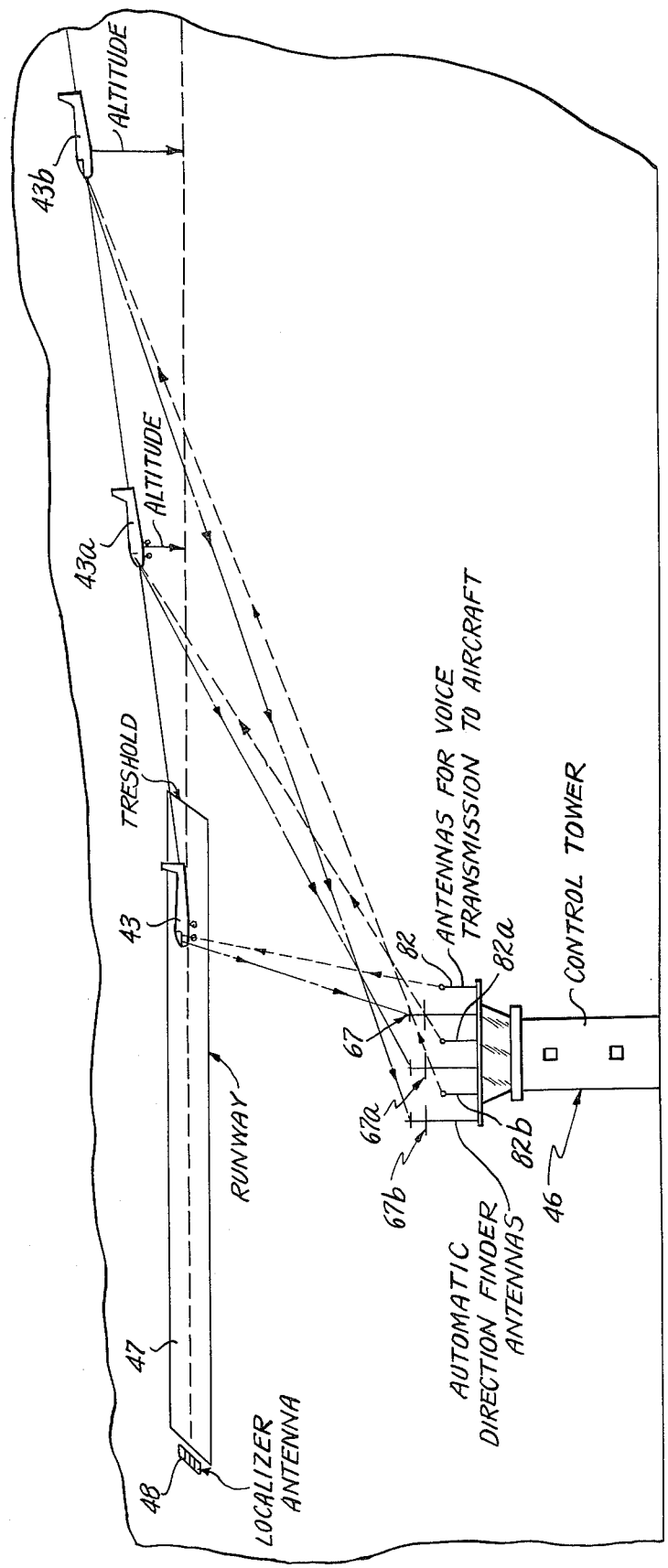
FIG. 13 illustrates the conditions of repetition of voice transmission at preselected distances in the system of FIG. 8.

Refer to FIG. 1 to note that the runway 10, in this description is served with 9 transmitters 11 on one side of the runway and 9 transmitters 11' on the other side of the runway. The transmitter itself employed in the structure of FIGS. 1, 3, 5 and 6 is a simple voice-modulated crystal-controlled unit having less than 100 milliwatts power input to the r-f stage and transmitting on the 75 mHz portion of the radio spectrum to match the contemporary marker beacon receiver now in use, or a separate receiver if so desired. The performance of the transmitter is empirically determined after careful ground and air tests. The transmitter weighs six ounces without power supply, but including the half-wave antenna, which is oriented as shown in FIG. 1. The size of the transmitter lends itself to encapsulation in a sealed container 12 which is filled with an inert dry gas, and shielded electrically, and thermally, by means of the shield 13 (FIG. 6). In the form in which the transmitter is employed as shown in FIGS. 1 and 6 it is arranged for plug-in connection to the conduit 14 which in turn may be mechanically and electrically connected to selected runway light support 16 where the transmitter and its associated power converter 17 (transformer and rectifier) may share the electrical energy supplied to the runway light 15. Since the runway lights will be activated during obscure weather and/or light conditions by closing the switch 18 it is an economy to use the circuitry provided. In the event the transmitters are not needed, such as on clear nights, the switch 16, FIG. 5 and FIG. 7 will remain open to deactivate the voice modulation output to the transmitter circuits.

Voice modulation of the transmitter is supplied to the various transmitters by means of the playback of recorded voice. Voice recordings may be stored on magnetic tape or disc or drum, or on transparent film or disc or drum by means of light modulated recording. Refer to FIG. 7 in which are shown 4 multiple track gauged endless tape players, each identified by the numerals 19, 20, 21 and 22. The multiple track endless tape player 19 will supply, by means of ground telephone cable 23 the individual circuits to voice modulate the transmitters 11' for the purpose of providing the pilot of an aircraft with needed position information during take-off on runway 030. If a dense fog obscured all vision the pilot would secure the mid-line of the runway by means of the ILS localizer and by moving on a heading of 210° proceed until he heard on the aircraft receiver the word "zero" being repeated in quick succession (about 3 words per second). He would then turn the aircraft to assume the runway heading of 030° and begin the take-off roll. His knowledge of the particular aircraft take-off performance will dictate that for each 1,000 feet of roll he must secure a proportional airspeed indication, which if not achieved will require the aborting of the take-off. As the aircraft position enters a runway locus within about 200 feet of position 1 (FIG. 1) the spoken word "one" is heard, first increasing and then decreasing in volume until the aircraft passes from the range of the transmitter at that position. As each transmitter position is reached and identified by the spoken word indicating distance along the take-off roll the pilot will prepare to "rotate" when the aircraft airspeed reaches an acceptable value, thereby completing the lift-off.

The early part of the take-off roll is critical to safety, so the position of the aircraft with respect to its performance is extremely important. Accordingly as each position transmitter is passed, the pilot can determine whether to continue or abort the take-off.

During the example just noted, the selector knob 25 would be set at the "3 TAKE-OFF" position as shown in FIG. 7. For the purpose of landing on Runway 3 the knob 25 of the selector switch would be set at position "LAND 3" as shown in FIG. 7.

With this position selected the tape player 20 will be activated in order that it will supply the position information needed in landing. All the tracks of the tape player 20 are activated to modulate the same transmitters 11' but now including the transmitter 11''' located at B' which is the boundary transmitter. It would be located as noted in FIG. 2 at approximately 1950 feet from the runway threshold (for a 3° glide slope configuration) and as the aircraft passes the boundary position the pilot would hear the word "boundary" repeated in quick succession. Experience with this system indicates that in an aircraft whose approach speed is about 125 knots five to six repetitions of the identifying word are heard. After passing the boundary transmitter the aircraft enters the radiated space pattern of the runway threshold so that the pilot will hear the spoken word "over" to indicate the aircraft position over the runway. Succeeding transmitter locations would be identified as noted above with each thousand feet being identified by the spoken word corresponding to the distance along the runway.

After halting the roll-out should the aircraft stop, say, between position "5" and position "6" the pilot may desire to taxi to position "7" where a taxiway is located for movement to the parking ramp. In obscure weather the expeditious ground operation of the aircraft to clear the runway is important and is aided by the runway transmitters if guide lights cannot be seen.

In FIG. 2 the approximate location of the ILS middle marker MM is shown in relation to the boundary marker BM and the runway threshold.

In the event runway 21 is to be used for flight operations the selector knob 25 will be adjusted to the proper position for "LAND 21" or "21 TAKE-OFF". In this event all the operations described above for runway 3 will be valid and the transmitters 11 and 11''' at position B will be activated. This will place in operation the tape player-amplifier units 21 and 22 and energize the telephone cable 26 to connect with the cable 27 underground to the various transmitter positions 11 as the cable 23 connects with the cable 28 to energize the transmitters 11' and 11'' at position B'.

It will be noted that certain simplifications can be made to reduce the number of transmitters by cross-use but in the interest of safety some duplication of the system is considered vital.

There may be situations where a limited number of portable runway transmitters may be used at small or hastily set up landing areas, or needed for emergency or temporary use. To satisfy these possible needs reference is made to FIG. 3 which shows a complete runway transmitter which includes the transmitter 29, the tape player 30, two batteries 31 and 32, battery test meter 33 and switch panel 34, suitable enclosed in a ventilated container 35, with shelf 36 and weather and heat shield 37 equipped with handle 38 and tubular extensions 39 which engage the leg extensions 40 of the container.

Another form of the invention is shown schematically in FIGS. 8 and 9. In this embodiment of the voice-directed fixing of position during either take-off or landing use is made of any precise method of tracking the aircraft in its path along the localizer 48 of the ILS (instrument landing system), while in flight, and along the runway 47 during roll-out as well as during take-off roll.

Several methods of tracking the aircraft may be employed, namely:

1. By primary radar
2. By secondary radar, transponder equipped
3. By low frequency automatic direction finder, necessitating a non-directional low power transmitter aboard the aircraft
4. By VHF direction finder utilizing the normal aircraft communication transmitter In FIG. 8 the servo-driven rotating shaft 41 of the automatic direction finder is connected to the shaft of a rotating switch 42, in this instance a photoelectric shutter switch. As the aircraft 43 is tracked in its approach path the photoelectric shutter switch will successively energize each of the relays 44 as the aircraft successively passes the positions A to K inclusive. In so doing the pilot of the aircraft will hear, for about 1½ seconds the quickly spoken words in succession as follows:

Five – four – three – boundary – near – over – one – two – three – four – five - - -

In this instance the runway of FIG. 8 is 6000 feet long. The first heard spoken word "five" indicates the aircraft to be 5000 feet from the threshold, and approaching the average location of the middle marker of the ILS aid. Since the tracking angle with the runway axis from the direction finder is 90 degrees at the locus of the boundary marker as shown at position D it is at this position where the greatest accuracy of "line of position" obtains. Only slightly less accurate is position E and F near and at the threshold. The probable error is well within practical limits at all position fixes.

On very long runways it may be desirable to add another tracking station 45 in addition to the tracking station 46.

As the direction finder tracks the aircraft to position A, its shaft rotates the cup-shaped shutter 49 within and close to the cylindrical wall 50 of the photoelectric switch. Light from the lamp 51, as shown in FIG. 9, will be admitted through both the aperture 52 of the shutter and the slit 53 in the wall 50. For about 1½ seconds this will activate the photoconductive cell 54 which is light shielded from adjacent photocells by the bulkhead 55. Each of the eleven photocells is light-shielded in like manner from the others and from external light by the circular cover 56 which supports the lamp 51. The power source 57 supplies current to each photocell, one terminal of which is grounded to a common ground which also serves each of the relays 44. The other terminals of the photocells lead to a series of binding posts 58 which in turn serve the coils of the relays 44. As each relay is activated, so is its matching tape player of the group of tape players 59. The output of each tape player connects to a common lead 60 which is the lead-in to the modulator of the single communication transmitter used to communicate position information to the aircraft. It may be that one special frequency may be allotted by the Federal Communication Commission for this particular service.

In order to more fully appreciate the combination of the various elements which provides distance information to the pilot of an aircraft in the approach/landing operation as depicted in FIGS. 8, 9 and 10, reference is now made to FIGS. 11, 12 and 13.

In FIG. 11 the aircraft 43 is equipped with its communication transmitter 61 which is assigned a suitable receiving frequency, such as 119.83 MHz so as to match an air traffic control tower frequency such as 119.80 MHz at a given airport. The pilot may receive instruction from the tower on the latter frequency, 119.80 MHz, and reply on the same frequency while guarding (listening on) the runway distance transmitter frequency 119.83 MHz which will transmit from the direction finder tape deck/transmitter unit the instant position of the aircraft. This is heard in the airplane 43 at the loudspeaker 62 which is interconnected to the receiver 63.

In order that the aircraft may be automatically tracked it must, when within range, transmit on its assigned transmitting frequency such as 119.85 MHz. This transmitter is activated when the aircraft is on final approach and only the carrier wave is transmitted without voice modulation.

It is within the scope of the invention to provide more than one direction finder at any given location. This may be needed in the event traffic is heavy so that two or more aircraft are in the approach pattern at the same time. One aircraft may be in the landing roll on the runway with its pilot listening to the information of distance along the runway on one frequency while a following aircraft may be a mile in trail, and a third aircraft on a 2 or 3 mile final, each on a different frequency. Since all three of the aircraft will need distance information it will be necessary to have three direction finder receivers at one location, although all can be served by the same power supply. However, each will have a discrete frequency such as for instance 118.95 MHz, 119.85 MHz, and 121.75 MHz.

This accordingly would permit each pilot of each aircraft in the approach/landing configuration to guard the particular tower frequency assigned to him by the approach controller. This arrangement will then provide multiple approaching aircraft with distance information during the approach to the runway threshold as well as distance along the runway in the landing roll, and for distance remaining on the takeoff roll.

The proper operation of the system requires that the aircraft make a straight line approach following the localizer course of the ILS (Instrument Landing System) during the time it is being tracked by the automatic direction finder.

FIG. 12 is a pictorial representation of the diagrammatic presentation of FIG. 8 and portrays the utilization of a VHF/UHF direction finder of automatic type which is well known in the art. There are several types of these, one of the latest being known as the Doppler DF which has an accuracy within 2 degrees of actual bearing.

Other systems of direction finding such as radar monopulse tracking could be used, however the VHF/UHF DF is the most practical for the instant system, and less costly.

FIG. 13 shows the use of multiple automatic direction finders at one location, selected for convenience of housing and of power supply, so organized to serve three approaching aircraft which would obtain during dense traffic operations. Each direction finder would receive and transmit on two separate frequencies discrete from the others and could be identified as, say, channels A, B, and C so that approaching aircraft can be advised to select a channel that is available as the just landed, or just departing aircraft relinquishes the runway distance service. Each approaching or departing aircraft is advised of the channel to use through the normal radio contact with the control tower.

In FIG. 13, as each aircraft reaches a selected distance from the threshold the pilot hears spoken words which describe the aircraft distance measured in any units such as miles, meters or feet, followed by a word that corresponds to the correct altitude above sea level, or above touchdown, at which the aircraft should be to insure obstacle clearance, such as "One mile - 1500 feet," followed by the expression, at the next position report, "Half-Mile - 700 feet." Each expression of course is being continuously repeated by the tape player and under normal approach speeds of the aircraft of about 120 knots the pilot would hear the expression three or four times. A slower aircraft with an approach speed of about 70 knots would traverse the same included angle from the direction finder in a longer period of time so that its pilot would hear the voice transmission about five to seven times. These time intervals are dictated by time of activation of each photocell 54, FIG. 8.

From the foregoing description of FIGS. 8, 9, 10, 11, 12 and 13, it is seen that the voice directed aircraft navigation system is used in combination with an instrument landing system having a transmitter for lateral guidance of an aircraft on a runway center-line course during landing and takeoff. The aircraft landing and takeoff monitoring system invention informs the aircraft crew by voice both the longitudinal location of the aircraft at preselected intervals along the runway path as well as at intervals along its path to or from the runway. The monitoring system of the invention comprises at least one ground based direction finder for tracking the aircraft by means of the radio signals emitted by the aircraft transmitter and further comprises switching means which are arranged to energize successively prerecorded tracks of a multiple track tape player.

Further, the monitoring system comprises means for broadcasting by interconnected radio transmitters the prerecorded voice which corresponds to the energized track which has been selected. The voice transmission from the selected track identifies the position of the aircraft on the runway center line course projected, the signals identifying successive positions of the aircraft during takeoff or landing. The radio receiver in the aircraft thus enables voice receptions of the position information emanating from the direction finder transmitter. The voice information is such that the switching means in the preferred rotary embodiment provides sequential switching to selected tracks to repeat the words describing the aircraft position.

The individual words that describe particular distances which are recorded on particular tracks of the tape player as noted in the description above are played back on tape players having multiple track which are well known in the art. Other forms of record/playback devices may be employed such as sound tracks on rotating discs, etc.

It is thought that the invention and its advantages will be understood from the foregoing description and it is apparent that various changes may be made in the form, construction and arrangement of the parts without departing from the spirit and scope of the invention or sacrificing its material advantages, the form hereinafter described and illustrated in the drawings being merely a preferred embodiment thereof.

What I claim is:

1. In combination with a voice directed aircraft navigation system having
    a transmitter for lateral guidance of an aircraft during landing and takeoff;
    a transmitting means on the aircraft emitting radio signals of selected frequency and for a pre-set time to a direction finder;
    means defining a runway center-line course which is taken by the aircraft during approach, landing, and takeoff as a landing runway equipped with a radio localizer transmitter for guiding said aircraft along the extended center-line path of the said runway; and
    an aircraft monitoring system for informing the aircraft crew by voice the longitudinal location of the aircraft at preselected intervals along its path to and from the runway as well as along the runway, said monitoring system comprising:
    at least one ground based automatic direction finder including a rotating element adjacent the runway for tracking the aircraft by means of radio signals emitted by the aircraft in the approach as well as in the landing path, said automatic direction finder having a receiver tunable to the said selected transmitter frequency of the aircraft transmitting means;
    sequential switching means including a photoelectrical switching means connected to the rotating element of said automatic direction finder, which constitutes a rotation element of the direction finder and is provided with means for connecting the said rotation element of the automatic direction finder to a sequential switch;
    a multiple track tape player having preselected tracks, said switching means energizing in succession preselected tracks of said tape player;
    voice modulated broadcasting means including interconnected radio transmitter means supplied by the preselected tracks of said multiple track tape player to broadcast to the aircraft receiver of the aircraft being tracked a sound and voice transmission corresponding to the track selector and identifying the position of the aircraft along the centerline course, said voice modulated means broadcasting on a frequency other than that in use by the transmitter of the aircraft, whose input is derived from the output of an associated multiple track tape player;
    the sequential switch of said sequential switching means providing means for electrically coupling that particular track of the multiple track tape player which contains the recorded spoken words of aircraft position which corresponds to the instant position of the aircraft being tracked along the said localizer path by the said automatic direction finder and to provide sequential switching to selected tracks of said multiple track tape player so arranged to permit energization of the said selected track of a duration ample to permit the voice broadcast of aircraft position by repetition of words descriptive of the aircraft position;
    radio receiver means in the aircraft for receiving each pre-recorded voice message in proper sequence from the tape player which is transmitted by the radio transmitter means at the automatic direction finder whereby there is received voice reception identifying positioning movements of the aircraft along the runway extended; and,
    audio speaker means connected to the radio receiver means for presenting to the aircraft crew the spoken words generated and broadcast by the said tape player transmitter combination of the said automatic direction finder.

* * * * *